(12) United States Patent
Alazraki et al.

(10) Patent No.: US 7,471,620 B2
(45) Date of Patent: *Dec. 30, 2008

(54) METHOD FOR THE SELECTION OF FORWARD ERROR CORRECTION (FEC)/CONSTELLATION PAIRINGS FOR DIGITAL TRANSMITTED SEGMENTS BASED ON LEARNING RADIO LINK ADAPTATION (RLA)

(75) Inventors: Scott M. Alazraki, Davie, FL (US); Apoorv Chaudhri, Sunrise, FL (US); Alan P. Conrad, St. Charles, IL (US); Stanko Jelavic, Davie, FL (US); Chet A. Lampert, Plantation, FL (US); Bob D. Logalbo, Hoffman Estates, IL (US); Darrell J. Stogner, Plantation, FL (US); Ellis A. Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 474 days.

This patent is subject to a terminal disclaimer.

(21) Appl. No.: 10/955,554

(22) Filed: Sep. 30, 2004

(65) Prior Publication Data

US 2006/0067256 A1 Mar. 30, 2006

(51) Int. Cl.
*H04J 9/00* (2006.01)
(52) U.S. Cl. .................. 370/204; 370/442; 370/458; 375/298

(58) Field of Classification Search ............. 370/204, 370/207, 252, 253, 229, 300, 301, 442, 465; 375/298, 265
See application file for complete search history.

(56) References Cited

U.S. PATENT DOCUMENTS

| | | | | |
|---|---|---|---|---|
| 5,233,629 | A * | 8/1993 | Paik et al. | 375/262 |
| 5,377,194 | A * | 12/1994 | Calderbank | 370/524 |
| 5,533,004 | A | 7/1996 | Jasper et al. | |
| 6,920,150 | B1 * | 7/2005 | Pauls et al. | 370/465 |
| 6,985,458 | B2 * | 1/2006 | Freedman et al. | 370/321 |
| 7,171,169 | B2 * | 1/2007 | Habetha | 455/102 |
| 2002/0114379 | A1 * | 8/2002 | Uesugi et al. | 375/219 |

* cited by examiner

*Primary Examiner*—Ricky Ngo
*Assistant Examiner*—Gary Mui
(74) *Attorney, Agent, or Firm*—Barbara R. Doutre

(57) ABSTRACT

A method for the selection of forward error correction (FEC)/constellation pairings (800) for digital transmitted segments based on learning radio link adaptation (RLA) including formatting a packet transmission having a predetermined number of information bits (801). The packet is then split into a plurality of segments (803) where an RLA is used (805) to determine the optimum format of the packet. The plurality of segments is then sent to a channel encoder for FEC encoding and symbol mapping (807) at a rate selected by the RLA. The segments are then formatted into packet blocks (809) and transmitted in blocks that form a time slot at a constant symbol rate.

26 Claims, 6 Drawing Sheets

| Combination Number | Modulation Rate (with K-Bits/Symbol) | Code Rate (R) | Max User Data Blocks per Slot | Effective Data Rate (Information Bits/Symbol) |
|---|---|---|---|---|
| 1 | QPSK (2) | 1/2 rate (1/2) | 1 | 1:1 |
| 2 | QPSK (2) | uncoded (1/1) | 2 | 2:1 |
| 3 | 16-QAM (4) | 1/2 rate (1/2) | 2 | 2:1 |
| 4 | 64-QAM (6) | 1/2 rate (1/2) | 3 | 3:1 |
| 5 | 16-QAM (4) | uncoded (1/1) | 4 | 4:1 |
| 6 | 64-QAM (6) | 2/3 rate (2/3) | 4 | 4:1 |
| 7 | 64-QAM (6) | uncoded (1/1) | 6 | 6:1 |

| User Data Block Packing Structure within a Slot (when all blocks are uncoded) ||||||
|---|---|---|---|---|---|
| 0 | QPSK, no coding |||| QPSK, no coding |  ~701 |
| 1 | 16-QAM, no coding | 16-QAM, no coding || 16-QAM, no coding | 16-QAM, no coding | ~702 |
| 2 | 64-QAM, no coding | 64-QAM, no coding | 64-QAM, no coding | 64-QAM, no coding | 64-QAM, no coding | 64-QAM, no coding ~703 |
| 3 | QPSK, no coding || 16-QAM, no coding | 64-QAM, no coding || not used ~705 |

◄──── 1 Slot ────►

| User Data Block Packing Structure within a Slot |||||
|---|---|---|---|---|
| 4 | QPSK, 1/2 Rate |||| ~707 |
| 5 | 16-QAM, 1/2 rate || 16-QAM, 1/2 rate || ~709 |
| 6 | 16-QAM, 1/2 rate || 64-QAM, 2/3 rate | 64-QAM, 2/3 rate | ~711 |
| 7 | 64-QAM, 1/2 rate | 64-QAM, 1/2 rate || 64-QAM, 1/2 rate | ~713 |
| 8 | 64-QAM, 2/3 rate | 64-QAM, 2/3 rate | 64-QAM, 2/3 rate | 64-QAM, 2/3 rate | ~715 |
| 9 | Signaling Data | 16-QAM, 1/2 rate || 64-QAM, 1/2 rate | ~717 |
| 10 | Signaling Data | 64-QAM, 2/3 rate | 64-QAM, 2/3 rate | 64-QAM, 2/3 rate | ~719 |
| 11 | Signaling Data | 64-QAM, no coding | 64-QAM, no coding | 64-QAM, no coding 64-QAM, no coding 64-QAM, no coding | ~721 |
| 12 | Signaling Data || 64-QAM, 1/2 rate | 64-QAM, 1/2 rate | ~723 |
| 13 | Signaling Data || 64-QAM, no coding 64-QAM, no coding | 64-QAM, no coding 64-QAM, no coding | ~725 |
| 14 | Signaling Data ||| 16-QAM, 1/2 rate | ~727 |
| 15 | Signaling Data ||| 64-QAM, 2/3 rate 64-QAM, 2/3 rate | ~729 |
| 16 | Signaling Data ||| 64-QAM, no coding 64-QAM, no coding 64-QAM, no coding | ~731 |
| 17 | Signaling Data ||| 64-QAM, 1/2 rate | ~733 |
| 18 | Signaling Data ||| 64-QAM, no coding 64-QAM, no coding | ~735 |
| 19 | Signaling Data ||| 64-QAM, no coding | ~737 |
| 20 | Signaling Data |||| ~739 |

◄──── 1 Slot ────►

*FIG. 7*

METHOD FOR THE SELECTION OF FORWARD ERROR CORRECTION (FEC)/CONSTELLATION PAIRINGS FOR DIGITAL TRANSMITTED SEGMENTS BASED ON LEARNING RADIO LINK ADAPTATION (RLA)

TECHNICAL FIELD

This invention relates in general to the improvement of data channel efficiency and more particularly to the optimal selection of data rate for a given transmitted segment.

BACKGROUND

Radio frequency (RF) communication systems for the transmission of data information (i.e. binary coded information) are well-known in the art. RF data communication systems generally provide a single channel data rate to their users. In these systems, the modulation and error coding are designed to provide acceptable performance for users at the edge of the desired coverage area, where generally worst case signal quality conditions are experienced.

It is well-known that, at signal quality levels typical of those found in closer proximity to a transmitting antenna (rather than at the edge of a radio coverage area), higher data rates with corresponding higher data throughputs are possible. It is also well-known that a relatively wide dynamic range of signal quality levels (e.g., 20-80 dB or decibels) typically exists within the coverage area of a mobile radio communication system. Therefore, users of prior art data communication systems who experience signal quality levels significantly above those found near the fringe of the coverage area generally suffer a lower grade of performance, in terms of data throughput, than would otherwise be possible.

In the field of wireline telecommunications, data modems that provide multiple data rates in response to signal quality levels are well-known. The methods used in this art, however, are not well-suited for application to radio data systems in general, and particularly to radio systems employing Time Division Multiple Access (TDMA). In TDMA systems, the radio channel is divided into a series of time slots of predetermined constant duration, which are typically further grouped into frames, each frame containing a predetermined number of time slots. Multiple users are allowed to access the radio communication channel by transmitting in one or more time slots in each frame. Thus a complete communication is composed of a series of multiple transmissions, such that the duration of each transmission is equal to the time slot duration.

Radio data communication methods typically transmit data in variable length messages referred to as packets. Packets are formed by dividing the data into a series of fixed-size protocol units referred to as blocks. The combination of the data block size, the data transmission rate, and the TDMA slot size determines how effectively the TDMA channel can be used. For example, if an integer number of blocks would not fit evenly into each time slot, the capacity representing the fractional block may go unused, reducing the available throughput of the channel. Alternately, a synchronization method could be implemented to permit all of the data capacity to be utilized, but such techniques are often complex. This additional complexity manifests itself in increased cost and in additional communication overhead that also reduces available throughput. Assuming a predetermined time slot duration, it is possible to choose a block size that avoids these problems for a single transmission data rate.

A problem arises, however, when seeking to provide a channel that will support multiple data rates. Moreover, there is no record of modulation or code rate pairings as used with various users at specific cell site locations. Accordingly, a need arises for providing a plurality of data rates for use with an RF data system so that users may select that data rate that provides the best performance for their signal quality level. It is further desired that the multiple data rates be provided in a manner such that a TDMA communication channel can be utilized efficiently by a packet data protocol.

SUMMARY OF THE INVENTION

Briefly, according to the invention, there is provided a learning radio link adaptation (RLA) that uses its knowledge of the modulation and code rate pairing that was used during successful or unsuccessful transmissions of past confirmed data segments to improve the throughput and/or reliability of future transmissions. Parameters are available for each of the past data segment transmissions that are maintained by Packet and Segment numbers. These parameters may include all of the following: the modulation and code rate pairing used for the prior confirmed transmission, whether the prior confirmed transmission was successful and included an acknowledgement, the signal quality estimate (SQE) at the time of the prior confirmed transmission, the location of the transmitting subscriber with respect to the repeater or cell site at the time of the prior confirmed transmission, and the velocity of the subscriber unit at the time of the prior confirmed transmission. The learning RLA also utilizes the current values of three of the learning RLA input parameters (SQE, location, and velocity) when determining the coding rate and modulation choice for the current segment transmission. With knowledge of these parameters, the learning RLA can "learn" so that it has a better chance of successfully transmitting a data segment in a certain set of channel conditions in the future. It can use the statistics this information provides when deciding upon a modulation and code rate pairing for other similar data segment transmissions (at similar distances, SQE, and/or velocity) in the future.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 7 is a diagram illustrating the format of TDMA time slots using multiple data rates in accordance with the invention.

DETAILED DESCRIPTION OF THE PREFERRED EMBODIMENT

Figure 1:
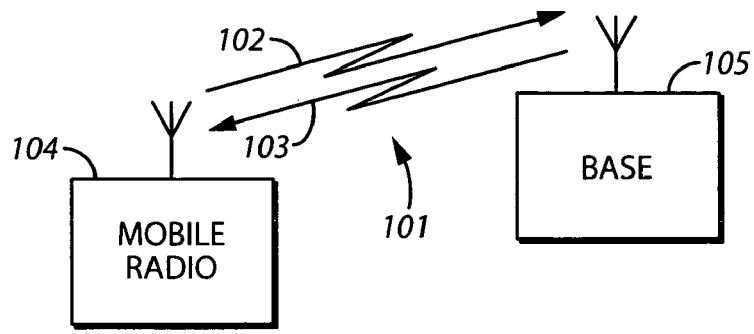
FIG. 1 is a block diagram of a Radio Frequency communication system in accordance with the present invention.

While the specification concludes with claims defining the features of the invention that are regarded as novel, it is believed that the invention will be better understood from a consideration of the following description in conjunction with the drawing figures, in which like reference numerals are carried forward.

The following paragraphs describe in detail a method for maximizing data communication system throughput in a fashion that avoids the shortcomings revealed in the foregoing discussion of the background art. The method described combines multiple Forward Error Correction (FEC) procedures with multiple modulation constellations, resulting in multiple data rates optimized for a given signal quality measure to provide maximum data throughput for signal conditions.

In a preferred embodiment, the method may be applied to a Radio Frequency (RF) communication system using TDMA (Time Division Multiple Access) to integrate multiple services, such as user and control data, within the same RF communication channel. Of course, the principles described herein are equally applicable to many other types of communication systems as well.

Referring to FIG. 1, the RF communication system 100 of the preferred embodiment makes use of one or more RF communication channels 101 to provide a variety of communication services, among them voice and data (i.e. binary coded information) communications. Each RF communication channel 101 in fact is comprised of two RF frequencies 102, 103, about which the radio signals are modulated. One of the RF frequencies is referred to as the inbound frequency 102 and is used for the transmission of information from mobile radio devices (mobile units) 104 to base radio devices (base units) 105. The second of the RF frequencies is referred to as the outbound frequency 103 and is used for the transmission of information from base units 105 to mobile units 104. Frequency assignments are typically made in a manner such that there is a constant spacing or offset between the inbound and outbound frequency of a communication channel. Further, in the preferred embodiment, the offset between adjacent communication channels (i.e., between adjacent inbound frequencies or adjacent outbound frequencies) is 25 kHz, 50 kHz, 100 kHz, or 150 kHz.

Figure 2:
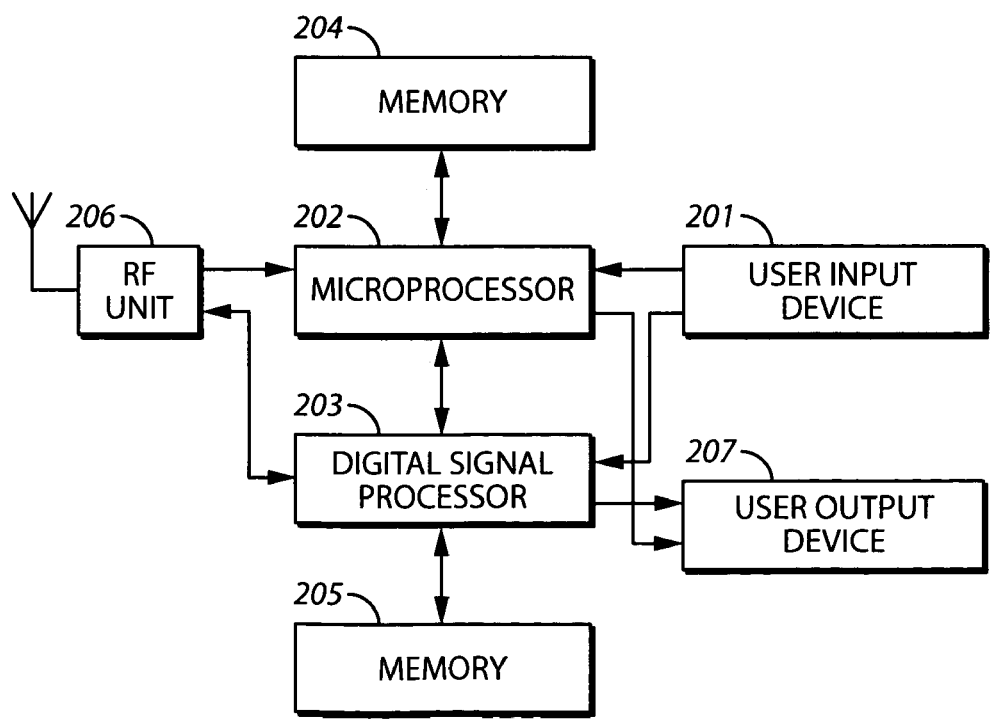
FIG. 2 is a block diagram of a radio device that may be used to implement the present invention.

The configuration of radio units 104, 105 in accordance with the preferred embodiment is illustrated in the block diagram of FIG. 2. Information to be transmitted is provided by a user input device 201. The user input device may be a network or computer interface in the case of a mobile unit 104 or a network or computer interface in the case of a base unit 105. Information supplied by the user input device 201 is applied to a microprocessor 202. The microprocessor 202 and the digital signal processor 203 work in concert to encode and format the information for transmission. The encoding and formatting operations are generally executed via algorithms which are typically implemented with sequences of software commands stored in the memory devices provided 204, 205. The memory devices 204, 205 will also typically contain read/write memory used to store the information during processing. After the information is encoded and formatted, it is passed by the digital signal processor 203 to the RF unit 206 for transmission on the RF channel 101. The digital signal processor 203 acts to control features of the RF unit (e.g., timing) to ensure that the information transmission is compatible with the requirement of the RF channel 101.

RF signals received by the RF unit 206 are applied to the digital signal processor 203 for demodulation and decoding. As in the transmit case, the digital signal processor 203 acts to control the RF unit 206 in accordance with predetermined reception algorithms. After the received information is decoded, the information is presented to the user output device 207. The user output device 207 may be a network or computer interface in the case of a mobile unit 104 or a network or computer interface in the case of a base unit 105. Thus, the radio unit 200 depicted in FIG. 2 acts to transmit and receive information between user devices and the RF channel 101. Also note that the user input device 201 and the user output device 207 may be the same unit.

Each of the inbound and outbound frequencies 102, 103 comprising the RF channel 101 are divided in time into a continuous series of time slots of equal or common duration. In the preferred embodiment, the common duration of each time slot is 30 ms (for 25 kHz offset between adjacent communication channels) or 10 ms (for 50 kHz, 100 kHz, or 150 kHz channels). Using a multiple access method well-known in the art as Time Division Multiple Access (TDMA), information is transmitted in the communication channel in bursts equal to the size of the time slots. In the preferred embodiment, the bursts are modulated onto the RF frequency using a Quadrature Amplitude Modulation (QAM) technique. QAM techniques are well-known by those skilled in the art as a means of modulating information organized into two-dimensional or complex symbols. Complex symbols are comprised of two scalar values, an in-phase value and a quadrature-phase value. These values are typically taken from a discrete set of values, with each value representing a binary coded number. For example, a 2 bit (binary digit) number would be represented by one of four possible values. The set of values represented by the complex symbols is referred to as a QAM constellation. The number of distinct values represented by a single symbol (the number of in-phase values times the number of quadrature-phase values) is typically used to describe the order or size of a QAM constellation. Thus, a QAM technique using 4 discrete values for each component is referred to as 16 QAM.

The QAM technique of the preferred embodiment is used to transmit symbols at a constant symbol rate. Hence, given the common duration of the time slots, a common number of symbols may be transmitted in each time slot. Some number of the symbols in each time slot are used for synchronization and other purposes not directly involved in the transfer of user or signaling information. The number of symbols remaining are used to communicate user or signaling information. The number of symbols per slot used to communicate user or signaling data depends upon the channel bandwidth and transmission direction and is: 324 symbols per slot for 25 kHz inbound, 348 symbols per slot for 25 kHz outbound, 252 symbols per slot for 50 kHz inbound, 276 symbols per slot for 50 kHz outbound, 552 symbols per slot for 100 kHz inbound, 612 symbols per slot for 100 kHz outbound, 852 symbols per slot for 150 kHz inbound, 948 symbols per slot for 150 kHz outbound. The grouping of symbols per slot used to communicate user or signaling data is referred to as a Normal Transmission Unit (NTU). In the discussion that follows, the case of a 25 kHz offset between adjacent communication channels on an inbound frequency 102 is described, thus 324 symbols per slot will be used as the NTU.

In the discussion that follows, the application of the present invention to the communication of packet data is described. Those of reasonable skill in the art should recognize how the concepts disclosed herein could be applied to other forms of communication. Radio data communication methods typically transmit data in variable length messages referred to as packets. Packets are formed by dividing the data into a series of fixed-size protocol units referred to as segments. The first segment of a packet is typically referred to as the header and contains addressing and other data communication control information. Subsequent segments typically contain the user data to be communicated by the communication system. In addition to the user data or header information, each segment is also configured with error detection coding, e.g., a Cyclic Redundancy Check (CRC) code, to permit the receiving unit to determine if errors occurred due to fading, noise, or interference during the transmission of the segment. In the preferred embodiment, each segment, including user data and CRC coding is comprised of 324 bits of information. The number of bits per segment depends upon the channel bandwidth and transmission direction and is: 324 bits for 25 kHz inbound, 348 bits for 25 kHz outbound, 252 bits for 50 kHz inbound, 276 bits for 50 kHz outbound, 552 bits for 100 kHz inbound, 612 bits for 100 kHz outbound, 852 bits for 150 kHz inbound, 948 bits for 150 kHz outbound.

Figure 3:
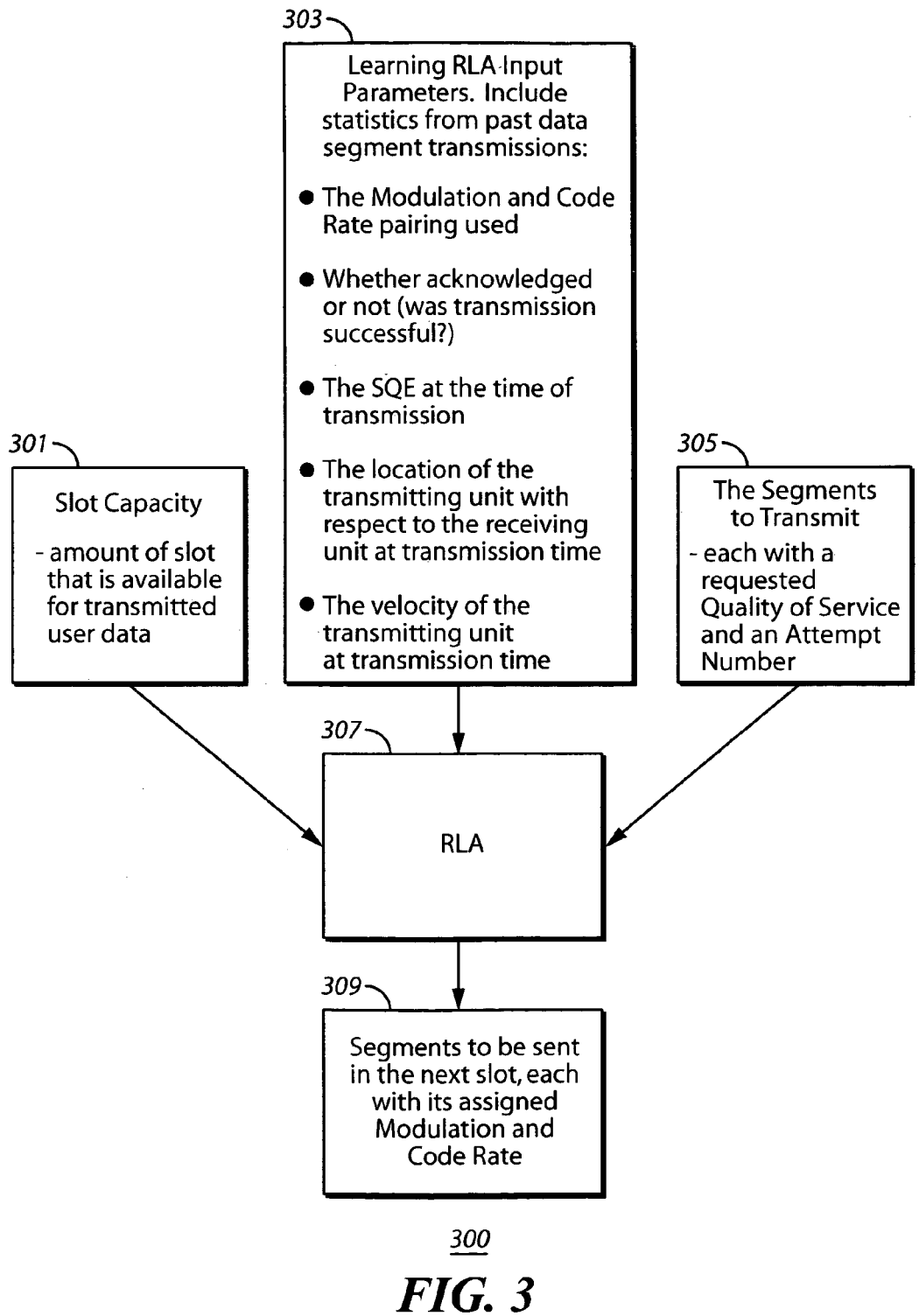
FIG. 3 is a block diagram illustrating the principles of learning radio link adaptation (RLA) discussed in the present invention.

In FIG. 3, the block diagram illustrates typical operation of the learning radio link adaptation (RLA) method 300 in accordance with the present invention. The RLA system uses at least three parameters to determine the best forward error correction (FEC) and modulation (constellation) choice. They include slot capacity 301, the learning RLA input parameters 303 and the transmitted segments 305 which operate with the RLA 307 which provides segments to be sent in the appropriate time slot 309 with the assigned modulation technique (modulation and code rate pairing). The learning RLA input parameters 303 are transmission parameters that are learned by the mobile unit through one or more previous confirmed communications with a base unit or another mobile unit. Statistics on these past confirmed transmission parameters are maintained and used by the learning RLA in its decision process. These parameters include the modulation and code rate pairing used for the prior confirmed transmission, whether the prior confirmed transmission was successful and included an acknowledgement, the signal quality estimate (SQE) at the time of the prior confirmed transmission, the location of the transmitting mobile unit with respect to the repeater or cell site at the time of the prior confirmed transmission and the velocity of the mobile unit at the time of the prior confirmed transmission. The learning RLA also uses current values of three of the learning RLA input parameters 303 (SQE, location, and velocity) when determining the coding rate and modulation choice for the current segment transmission. Finally, the segments to transmit are also considered that include a requested quality of service and the number of previous attempted transmissions. As will be evident to those skilled in the art, each of the slot capacity 301, learned input parameters 303 and transmission segments 305 are considered by the RLA 307 to determine the most efficient means of transmission. For example, suppose several past transmission attempts at SQE values within a specified range, with distances between the mobile unit and base unit within a certain range (or within a specified location area), and normalized vehicle velocities within a specified range, the confirmed data transmissions were successful at 16 QAM ½ rate but sometimes unsuccessful at 64 QAM ½ rate. Therefore, the next time the learning RLA of a mobile unit needed to send a confirmed data segment when the current SQE, distance from the base unit (or location), and normalized vehicle velocity are all within the same ranges, the learning RLA would use the 16 QAM ½ rate modulation technique if it wished to ensure that the data segment transmission would be successful. The learning RLA would know to choose 16 QAM ½ rate for this data segment transmission even if a default modulation technique (described later) for the current SQE or quality of service was mapped to a modulation technique other than 16 QAM ½ rate.

Figure 4:
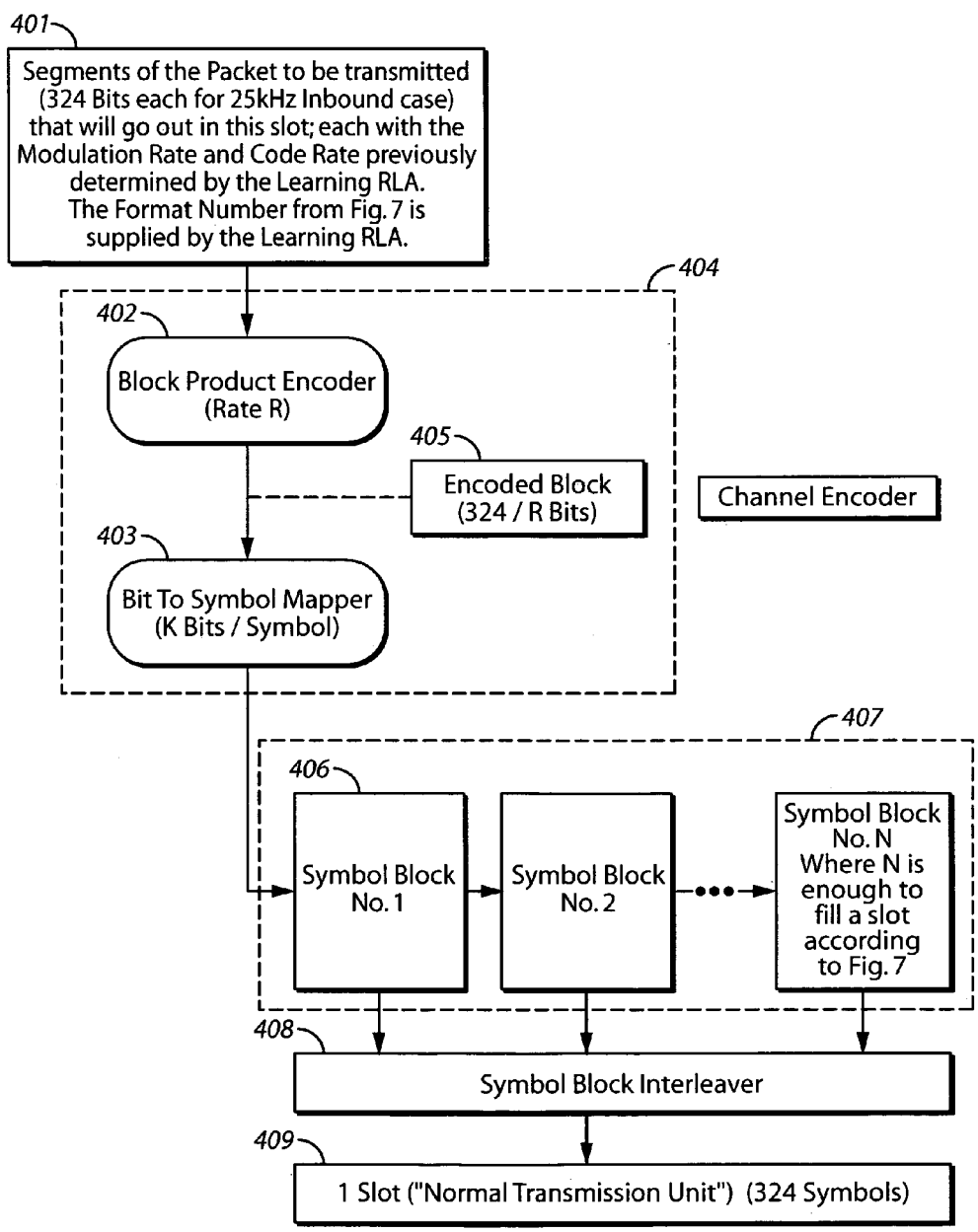
FIG. 4 is a block diagram of a general Forward Error Correction (FEC) and formatting procedure in accordance with the present invention.

As seen in FIG. 4, a block diagram is illustrated that represents the FEC coding and formatting procedures that are used to transmit the data segments. The transmit procedure is described herein where the receive process is a straightforward reversal of the transmit process. In the preferred embodiment, these processes would be implemented in the digital signal processor 203 depicted in FIG. 2. According to the invention user data is first parsed into segments as described earlier (not shown in FIG. 4). Segments 401 each 324 bits long, are first encoded using a channel encoder 404. The segments of the packet to be transmitted include a modulation rate and code rate previously determined by the learning RLA as seen in FIG. 3. The format number as described hereinafter is supplied by the learning RLA.

Conceptually, the channel encoder 404 may be viewed as the combination of a block product encoder 402 and a bit-to-symbol mapper 403, where the designs of the coder and mapper have been jointly optimized to achieve desirable performance under a predetermined range of signal quality. The block product encoder 402 operates to encode the input data at an encoding rate R, where R is the ratio of input bits to output bits and is generally less than one. For example, a coder of rate ½ will produce 2 output bits for every input bit.

Thus, the block product encoder 402 produces an output encoded block 405 of length 324/R bits. The encoded block 405 is fed into a bit-to-symbol mapper 403 that takes groups of encoded bits and produces complex symbols. This operation also has a characteristic rate, the number of bits grouped into each symbol K. Together, the coding and symbol mapping steps form a channel encoder 404 with coding rate R and constellation size $2^K$.

The output of the channel encoder 404 is a symbol block 406 containing 324/KR complex symbols. This symbol block is inserted into a symbol block buffer 407. After enough symbol blocks are collected in the buffer to fill an entire slot according to the format number that was supplied by the learning RLA, a symbol block interleaver 408 combines the blocks to form a single NTU 409 of 324 symbols. This NTU 409 is output to a RF modulation process for transmission according to principles well-known in the art.

It should be clear from the preceding discussion that the parameters K and R can be adjusted to control the number (K*R) of segments 401 assembled per NTU 409, allowing variable user data rates to be supported while constraining K*R to be an integer.

Figures 5, 6:
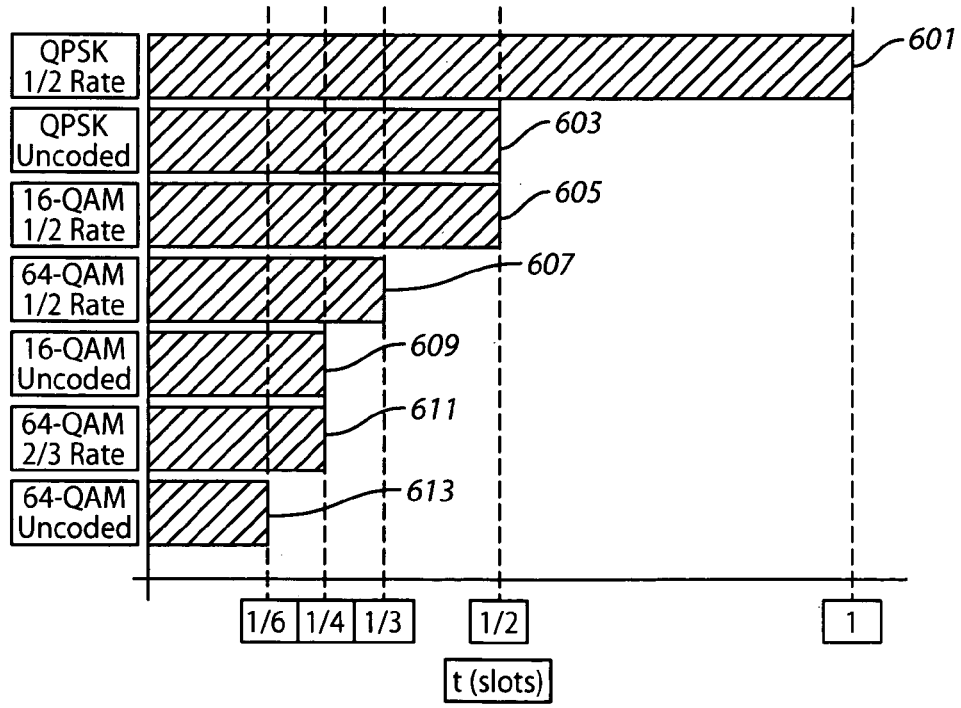
FIG. 5 is a table illustrating combinations of modulation rates and code rates in accordance with the present invention.
FIG. 6 is a diagram illustrating the duration of data blocks using multiple data rates in accordance with the preferred embodiment.

FIG. 5 illustrates seven combinations which satisfy these RLA criteria. For example, consider the first combination of QPSK (2). Here a rate ½ code is used so that the block product encoder 402 shown in FIG. 4 would produce 648 output bits from the 324 input bits of each segment 401. In this case, a 4 QAM (also known as Quadrature Phase Shift Keyed (QPSK)) constellation is used which groups 2 bits into each symbol. Thus, 324 symbols are produced from each segment 401. Hence, one such encoded block can be placed in a single NTU. Thus the effective information bit to transmitted symbol ratio is 1:1. Now consider the third combination in FIG. 5. Here a rate ½ code is also used. However, in this case, a 16 QAM constellation is used which groups 4 bits into each symbol. Thus, 162 symbols are produced from each segment 401. Hence, 2 such encoded blocks can be placed in a single NTU comprised of 324 symbols producing an effective information bit to transmitted symbol ratio of 2:1. Note that since the NTU in either case occupies a single channel time slot, the effective data rate of the second combination is twice that of the first. Similarly, the second, fourth, fifth, sixth and seventh combinations in FIG. 5 illustrate other code rate and QAM constellations that are utilized to produce effective information bit to transmitted symbol ratios of 2:1, 3:1, 4:1, 4:1 and 6:1, respectively, so that data rates two, three, four and six times that of the first combination are realized.

The operation of the encoder is further illustrated by the timing diagrams of FIG. 6 and FIG. 7. In FIG. 6, the transmit time duration of a single encoded block is shown for each of the encoding combinations shown in FIG. 5. The QPSK half rate encoded block 601 has a duration equal to the full NTU. Alternately, the QPSK uncoded block 603 and the 16-QAM half rate block 605 have a duration equal to ½ of a full NTU. The 64 QAM half rate encoded block 607 has a duration equal to ⅓ of a full NTU while the 16 QAM uncoded and the 64 QAM ⅔ rate have a duration equal to ¼ of a full NTU. Finally the 64 QAM uncoded block 613 has a duration equal to ⅙ of a full NTU.

FIG. 7 illustrates NTUs formatted using each of the seven encoding combinations shown in FIG. 5. The upper portion of the FIG. 7 illustrates the user data block packing structure within a slot when all blocks are uncoded (used mostly for testing) while the lower portion of the figure illustrates the user data block packing structure within a slot for normal operation. With regard to the blocks which are uncoded, the first NTU 701 is comprised of two QPSK uncoded blocks. The second NTU 702 is comprised of four 16 QAM uncoded blocks. The third NTU 703 is comprised of six 64 QAM uncoded blocks. Finally, the fourth NTU 705 is comprised is one QPSK uncoded block, one 16 QAM uncoded block and one 64 QAM uncoded block.

In the lower portion of FIG. 7, NTU 707 shows a single block of QPSK ½ rate. NTU 709 is comprised of two 16 QAM ½ rate blocks. NTU 711 is comprised of one 16 QAM ½ rate block, two 64 QAM ⅔ rate blocks. NTU 713 is comprised of three 64 QAM ½ rate blocks. NTU 715 is comprised of four 64 QAM ⅔ rate blocks. NTU 717 is comprised on one signaling data block, one 16 QAM ½ rate block and one 64 QAM ½ rate block. NTU 719 is comprised one signaling data block, one 64 QAM ½ rate block, and two 64 QAM ⅔ rate blocks. NTU 721 is comprised of one signaling data block and five 64 QAM uncoded blocks. NTU 723 is comprised of one signaling data block and two 64 QAM ½ rate blocks. NTU 725 is comprised of one signaling data block and four 64 QAM uncoded blocks. NTU 727 is comprised of one signaling data block and one 16 QAM ½ rate block. NTU 729 is comprised of one signaling data block and two 64 QAM ⅔ rate blocks. NTU 731 is comprised of one signaling data block and three 64 QAM uncoded blocks. NTU 735 is comprised of one signaling data block and two 64 QAM uncoded blocks. NTU 737 is comprised of one signaling data block and one 64 QAM uncoded block. Finally, NTU 739 is comprised completely of a signaling data block.

Note that packets are always encoded into an integer number of NTUs. Thus, channel capacity is never wasted within a string of blocks transmitted at any of the available data rates.

It is intended that the different data rate options described here be used to optimize the net rate of user throughput which will vary according to the RF channel characteristics. It is well understood in the art that as the signal quality is improved, data communications at higher data rates, with correspondingly higher throughput, are feasible. The determination of the RF channel signal quality is not the subject of this invention. There exist many well known means of signal quality estimation, such as Received Signal Strength Indicators (RSSI), Bit Error Rate (BER) measures and the like, any of which could be used effectively with the present invention. It should be observed that RF channel signal quality estimate (SQE) is one of the learning RLA input parameters 303 of the learning RLA.

A typical packet communication would begin with the data unit, either base or mobile, selecting an initial or default modulation technique (modulation rate and code rate pairing) for its first transmission. In prior art selection mechanisms, the default selection may be based on a predetermined computation of which technique would have the highest probability of use. Alternately, the default selection may be based on the initial value of one or more of channel quality estimation measures. Subsequent transmissions would then take advantage of one or more of the available signal quality estimation measures to update the data rate selection. Alternately, in prior art selection mechanisms; the default selection may simply be the modulation technique with the highest throughput. Then, if retries were required due to transmission failures, the prior art selection mechanisms would increase the reliability of the modulation technique for the next attempt. This process would continue for each retry attempt until the confirmed transmission was successful.

The learning RLA of the invention can select the initial or default modulation technique based upon several factors. The learning RLA can implement a direct mapping of the desired quality of service for the segment to a particular modulation technique. The learning RLA can use the attempt number of the segment to possibly increase the reliability of the modulation technique over its normal value for retry transmission attempts. The learning RLA can choose to send unconfirmed transmissions with a modulation technique of higher reliability than it would choose to use for confirmed transmissions (if there is only one chance to successfully transmit the data, the RLA may choose to increase the reliability of the modulation technique over its normal value).

The learning RLA of the invention also uses statistics of past transmission parameters (the learning RLA input parameters 303, observed under similar channel conditions to those currently experienced) to select or further modify the initial modulation technique for a transmitted segment so that it will have a greater likelihood of success. In this manner, bandwidth is not wasted by transmitting segments with an inappropriate modulation technique for the current channel conditions. The learning RLA makes more efficient use of the channel by storing information of past confirmed transmissions and using the statistics to improve the throughput and/or reliability of current confirmed or unconfirmed transmissions.

In addition, the statistics of past transmission parameters (the learning RLA input parameters 303) can be shared by existing mobile units with mobile units that are new to the system or shared by existing base units with new base units. New mobile or base units do not possess the wealth of statistics of prior learning RLA input parameters 303 that are available. New or replacement mobile or base units may require some period of time to acquire the learning RLA knowledge needed for optimum performance. During this time period, the new mobile or base units would operate with degraded performance. Since existing mobile or base units all ready possess this learning RLA knowledge, it can be shared. In this manner, new mobile or base units can quickly acquire the learning RLA knowledge needed for optimum performance in the system. This information can be broadcasted over the air or it can be transferred during initial programming or configuration.

An alternate form of the learning RLA invention further subdivides the system coverage area into "zones." Typically, such zones would correspond to sites or geographic zones normally associated with a wide area system. Separate "profiles" of stored learning RLA input parameters 303 and/or statistics could be associated with each zone. For a system with wide area coverage where terrain differences are often encountered in different zones, this allows the RLA information to more closely match each zone. Although the learning RLA approach alone will allow adaptation to changing geography, a zoned approach combined with the learning RLA approach will likely offer a better "fit" over either approach alone. The zone approach makes practical sense too, as most mobile units in a wide area system stay within one zone (or a small number of zones). The learning RLA input parameters 303 stored in a system for each zone can be shared with mobile units as they migrate into a zone.

Additionally, the learning RLA input parameters 303 of each mobile unit can be sent to the fixed end processing device (base unit). The base unit can then filter and combine the information from a plurality of units into a common learning RLA database, that subsequently can be broadcasted to all mobile units. As an example, if a particular area has severe interference that is difficult to detect by the SQE measurement methods of the prior art, the mobile units traveling through the area would experience multiple retransmissions and based on that would determine that the signal quality is poor for that particular location (also a learning RLA input parameter). This fact can then be transmitted to the fixed end. The RLA data processing device at the fixed end then can determine that a particular area is not suitable for the higher throughput modulation technique (based on multiple mobile unit inputs) and can share this with the mobile units that are new to that area.

Figure 8:
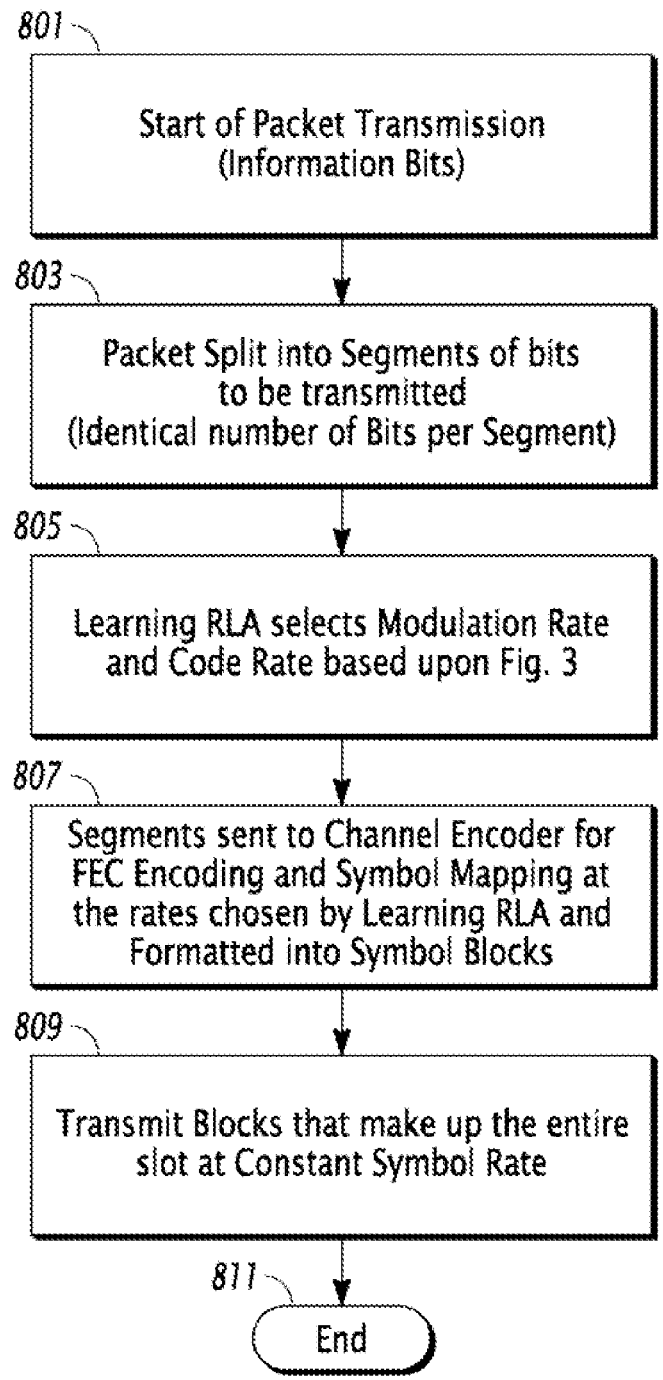
FIG. 8 is a flow chart illustrating the method of the invention.

The data transmission operation of the present invention will now be described with reference to the flow chart 800 depicted in FIG. 8. The process begins with a quantity of information bits provided 801 to be transmitted to at least one intended recipient. Packets are split into segments 803 to be transmitted where there are an identical number of bits per segment for a given channel bandwidth and transmission direction (inbound or outbound channel). The learning RLA then selects 805 the modulation rate and code rate based on the communication described in FIG. 3. Segments are sent 807 to a channel encoder for FEC encoding and symbol mapping at rates chosen by the learning RLA which are formatted in symbol blocks. The blocks are then transmitted 809 that make up the entire slot at a constant symbol rate on the RF channel. The process then ends 811 after the transmission of the blocks.

In a system of the present invention, it is important for the receiver of a data block to know the modulation technique that was used by the transmitter so that proper decoding of the transmitted data can be effected. In the inbound direction, a mobile unit will transmit a slot header in each slot. The slot header includes an indication of the data rate that has been selected for the transmission of each data block within the slot. This indication is the format number from FIG. 7. This slot header is always transmitted using a known predetermined modulation technique so that the base unit can decode its contents and use the format number contained therein for properly decoding the following data blocks of the slot. Thus, each mobile unit may independently select a data rate for each data block within each slot (NTU) as long as the slot conforms to one of the format numbers of FIG. 7.

The series of packets transmitted on the outbound channel is typically completely independent of the inbound packets. The modulation technique in use on the outbound channel is also signaled by a slot header included in each time slot. As in the case of the inbound packet preamble, the slot header is transmitted using a known predetermined modulation technique. Thus, a receiving unit first decodes the slot header to determine how to decode the remainder of the slot, independent of any traffic on the inbound side of the same channel. Similarly to the inbound, the data rate outbound may be varied for each data block within each slot as long as the slot conforms to one of the format numbers of FIG. 7.

Thus, the invention as described provides a combination of multiple Forward Error Correction (FEC) coding rates and multiple modulation constellations which are used to affect multiple channel data rates based on learned radio link adaptation (RLA). The learned RLA learns from confirmed radio transmissions and maintains statistics on the learning RLA input parameters based on the past transmissions. The learning RLA applies this data to future confirmed and unconfirmed transmissions. The learning RLA comprises the learning RLA input parameter statistics with current values of signal equality estimation (SQE), location and velocity to make its decision of the modulation and code rate pairing. The statistics of the past learning RLA input parameters can be shared between new or existing module units and base units. The learning RLA input parameters may also be shared with other users who enter into a zone using RLA. Multiple data rates provide multiple levels of throughput while maintaining an efficient use of the TDM slot resource. The constant symbol rate of the channel is unchanged for a given channel bandwidth and transmission direction (inbound or outbound channel), only the information content of each symbol is altered. Further, means are provided for each data unit, mobile and fixed, to independently choose the preferred data rate in response to several factors.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for the selection of forward error correction (FEC)/constellation pairings for digital transmitted segments comprising the steps of:
   formatting a packet transmission having a predetermined number of information bits;
   splitting the packet into a plurality of segments where each segments as an identical number of bits;
   utilizing a learning radio link adaptation (RLA) to determine an optimum format for the plurality of segments based upon current values of learning RLA input parameters and maintained statistics on learning RLA input parameters from previous confirmed transmissions;
   sending the plurality of segments to a channel encoder for FEC encoding and symbol mapping at a rate selected by the learning RLA;
   formatting the segments into packet blocks; and
   transmitting the blocks that form a time slot at a constant symbol rate.

2. The method of claim 1 wherein the learning RLA selects from at least one of a group of learning RLA input parameters comprising: modulation and code rate pairings based upon previously transmitted pairings, successful acknowledgement of previous transmissions, signal quality estimation at the time of transmission, geographic location and velocity of the transmitter.

3. The method of claim 2, wherein maintained statistics on learning RLA input parameters from previous transmissions are shared from an existing mobile unit with new mobile units.

4. The method of claim 2, wherein maintained statistics on learning RLA input parameters from previous transmissions are shared from an existing base unit with new base units.

5. The method of claim 2 farther comprising the step of sharing maintained statistics on learning RLA input parameters from previous transmissions.

6. The method of claim 5, wherein the step of sharing comprises the steps of:
dividing a system into a plurality of zones;
storing into the system a profile of previous transmission parameters associated with each zone; and
sharing the profile with a mobile unit as it migrates into a zone of the plurality of zones.

7. The method of claim 5, wherein the step of sharing comprises the steps of:
transmitting the maintained statistics from previous transmissions from a plurality of mobile units to a base unit;
combining the maintained statistics from the plurality of mobile units into a database; and
transmitting the combined statistics of the database from the base unit to the plurality of mobile units.

8. A method comprising the steps of:
providing a communication channel having a plurality of time slots, wherein each of the plurality of time slots has a common duration;
providing a quantity of information bits to be transmitted to at least one intended recipient;
providing a plurality of modulation techniques having corresponding effective data transmission rates;
selecting one of the plurality of modulation techniques to produce a selected modulation technique by utilizing a learning radio link adaptation (RLA) based on current values of learning RLA input parameters and maintained statistics on learning RLA input parameters from previous confirmed transmissions;
regardless of which of the plurality of modulation techniques was selected:
formatting the information bits into at least one block, such that an identical number of information bits are always contained within a single block; and
transmitting the at least one block in at least one of the time slots at a predetermined constant symbol rate using the selected modulation technique.

9. The method of claim 8, wherein the learning radio link adaptation includes using at least one from the group of modulation rate, code rate pairing, received acknowledgement, signal quality estimation (SQE), transmitter geographical location and transmitter movement and velocity.

10. The method of claim 8, wherein the step of transmitting the at least one block in at least one of the time slots includes the step of transmitting the at least one block such that all of the time slots will only contain an integer number of the blocks.

11. The method of claim 8, wherein the step of providing a communication channel includes the step of providing a communication channel that is one of a plurality of communication channels, wherein the plurality of communication channels are offset from adjacent communication channels by either 25 kHz, 50 kHz, 100 kHz or 150 kHz.

12. The method of claim 11, wherein the step of providing a communication channel having a plurality of time slots includes the step of providing a communication channel having a plurality of time slots, wherein each time slot has a duration of 30 milliseconds for 25 kHz communication channels and 10 milliseconds for 50 kHz, 100 kHz and 150 kHz communication channels.

13. The method of claim 8, wherein the step of providing a plurality of modulation techniques includes the step of providing a plurality of modulation techniques, including but not limited to a group comprised of quadrature phase shift keying (QPSK) ½ rate; QPSK uncoded, 16 quadrature amplitude modulation (QAM) ½ rate, 64 QAM ½ rate, 16 QAM uncoded, 64 QAM ⅔ rate and 64 QAM uncoded.

14. The method of claim 13, wherein the group of modulation techniques includes error correction coding and a variable information bit-to-symbol transmitted symbol ratio.

15. The method of claim 8, wherein the step of selecting one of the plurality of modulation techniques includes the step of selecting a predetermined one of the plurality of modulation techniques as an initial default selection.

16. The method of claim 8, wherein the step of formatting the information bits into at least one block includes the step of formatting the information bits into at least one block, wherein the information bits include both user data and cyclic redundancy check error detection coding.

17. The method of claim 8, wherein the step of formatting the information bits into at least one block includes the step of formatting the information bits into at least one block, wherein the information bits include both user data and error detection coding.

18. The method of claim 8, wherein the step of transmitting the at least one block in at least one of the time slots at a predetermined constant symbol rate using the selected modulation technique such that the number of symbols per slot used to communicate user or signaling data depends upon the channel bandwidth and transmission direction and is: 324 symbols per slot for 25 kHz inbound, 348 symbols per slot for 25 kHz outbound, 252 symbols per slot for 50 kHz inbound, 276 symbols per slot for 50 kHz outbound, 552 symbols per slot for 100 kHz inbound, 612 symbols per slot for 100 kHz outbound, 852 symbols per slot for 150 kHz inbound, 948 symbols per slot for 150 kHz outbound.

19. The method of claim 8, wherein the step of formatting the information bits into at least one block, such that an identical number of information bits are always contained within a single block includes the step of formatting the information bits into at least one block, such that the following number of information bits are always contained within a single block: 324 bits for 25 kHz inbound, 348 bits for 25 kHz outbound, 252 bits for 50 kHz inbound, 276 bits for 50 kHz outbound, 552 bits for 100 kHz inbound, 612 bits for 100 kHz outbound, 852 bits for 150 kHz inbound, 948 bits for 150 kHz outbound.

20. The method of claim 19, wherein the step of providing a plurality of modulation techniques includes the step of providing a plurality of modulation techniques, further comprising but not limited to a group comprised of quadrature phase shift keying (QPSK) ½ rate; QPSK uncoded, 16 quadrature amplitude modulation (QAM) ½ rate, 64 QAM ½ rate, 16 QAM uncoded, 64 QAM ⅔ rate and 64 QAM uncoded.

21. The method of claim 20, wherein the group of modulation techniques includes error correction coding and a variable information bit-to-symbol transmitted symbol ratio.

22. A method for transmitting user data through a wireless communication medium using at least one of a plurality of modulation techniques having corresponding effective data transmission rates, comprising the steps of:

providing a communication channel having a plurality of time slots, wherein each of the plurality of time slots has a predetermined duration;

providing a quantity of information bits to be transmitted to at least one intended recipient, wherein the information bits include both user data and error detection coding bits;

providing a plurality of modulation techniques;

selecting one of the plurality of modulation techniques based upon learning radio link adaptation (RLA) to produce a selected modulation technique based upon current values of learning RLA input parameters and maintained statistics on learning RLA input parameters from previous confirmed transmissions;

formatting the information bits using the selected modulation technique into at least one block, such that an identical number of information bits are always contained within a single block; and transmitting the at least one block in at least one of the time slots at a predetermined constant symbol rate using the selected modulation technique.

23. The method of claim 22, wherein the learning radio link adaptation includes selecting the modulation technique based upon at least one of the group of:

modulation and code rate pairings previously transmitted, successful acknowledgement of previous transmissions, signal quality estimation at the time of transmission, geographic location and velocity of the transmitter.

24. The method of claim 22, wherein the at least one of a plurality of modulation techniques includes but is not limited to a group consisting of quadrature phase shift keying (QPSK) ½ rate; QPSK uncoded, 16 quadrature amplitude modulation (QAM) ½ rate, 64 QAM ½ rate, 16 QAM uncoded, 64 QAM ⅔ rate and 64 QAM uncoded.

25. The method of claim 24, wherein the group of modulation techniques includes error rate coding and a variable information bit-to-transmitted symbol ratio.

26. The method of claim 22, further comprising sharing statistics of the learning RLA input parameters amongst existing and new units.

* * * * *